(12) United States Patent
Kim et al.

(10) Patent No.: US 9,268,774 B2
(45) Date of Patent: Feb. 23, 2016

(54) STORAGE MEDIUM, APPARATUS, AND METHOD TO AUTHOR AND PLAY INTERACTIVE CONTENT

(75) Inventors: Yeo-Jin Kim, Suwon-si (KR);
Yun-Gyung Cheong, Anyang-si (KR);
Eok-Soo Shim, Suwon-si (KR);
Wook-Hee Min, Gangnam-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1020 days.

(21) Appl. No.: 12/430,799

(22) Filed: Apr. 27, 2009

(65) Prior Publication Data

US 2009/0327898 A1 Dec. 31, 2009

(30) Foreign Application Priority Data

Jun. 27, 2008 (KR) .................. 10-2008-0061971
Dec. 18, 2008 (KR) .................. 10-2008-0129344

(51) Int. Cl.
*G09B 25/00* (2006.01)
*G06F 17/30* (2006.01)
*G11B 27/034* (2006.01)

(52) U.S. Cl.
CPC ...... *G06F 17/3002* (2013.01); *G06F 17/30029* (2013.01); *G11B 27/034* (2013.01)

(58) Field of Classification Search
CPC .................................. G09B 5/00; G09B 19/00
USPC .................................. 434/118, 322, 323, 365
See application file for complete search history.

(56) References Cited

U.S. PATENT DOCUMENTS

| | | | |
|---|---|---|---|
| 4,753,597 A * | 6/1988 | Pash et al. ...................... | 434/321 |
| 5,114,291 A * | 5/1992 | Hefty ............................... | 412/8 |
| 2002/0053089 A1* | 5/2002 | Massey ........................ | 725/135 |
| 2002/0093541 A1* | 7/2002 | Schileru-Key ................ | 345/855 |
| 2006/0234199 A1* | 10/2006 | Walker et al. ................ | 434/323 |
| 2007/0099684 A1* | 5/2007 | Butterworth ..................... | 463/1 |
| 2007/0202481 A1* | 8/2007 | Smith Lewis et al. ........ | 434/323 |
| 2008/0305460 A1* | 12/2008 | Garg ............................ | 434/118 |

FOREIGN PATENT DOCUMENTS

| | | |
|---|---|---|
| JP | 2003-288361 A | 10/2003 |
| KR | 10-2005-0040968 A | 5/2005 |
| KR | 10-0834904 B1 | 6/2008 |

OTHER PUBLICATIONS

Marc Cavazza, et. al., "Planning Character's Behaviour in Interactive Storytelling," pp. 1-10, School of Computing & Mathematics, University of Teesside, UK, 2001.
Ido Iurgel, "From Another Point of View: Art-E-Fact," 2004, LNCS 3105, pp. 26-35, TIDSE 2004, LNCS 3105, Springer-Verlag Berlin Heidelberg, Darmstadt, Germany.
Margaret Thomas Kelso, et al., "Dramatic Presence," 1993, pp. 1-16 Presence, 2(1).
Magerko, Brian. "Story Representation and Interactive Drama," American Association for Artificial Intelligence, 2005, pp. 1-6.

(Continued)

*Primary Examiner* — Kesha Frisby
(74) *Attorney, Agent, or Firm* — NSIP Law (57) ABSTRACT

A storage medium to store interactive content may include at least one content unit and interactive content including story map information, the story map information selectively connecting the at least one content unit according to conditions to form a story.

7 Claims, 6 Drawing Sheets (56) References Cited

OTHER PUBLICATIONS

Michael Mateas, et. al. "Structuring Content in the Facade Interactive Drama Architecture," American Association for Artificial Intelligence, 2005, pp. 1-7.

Mark O. Riedl, et. al. "Believeable Agents and Intelligent Story Adaptation for interactive Storytelling."

Mark O. Riedl, et. al. "From Linear Story Generation to Branching Story Graphs," IEEE Computer Graphics and Applications, May/Jun. 2006, pp. 23-31, IEEE Copmuter Society.

Ulrike Spierling, et. al. "Towards Accessible Authoring Tools for Interactive Storytelling."

W. Swartout, et. al. "Toward the Holodeck: Integrating Graphics, Sound, Character and Story." In Proceedings of Fifth Inernational Conference on Autonomous Agents. May 2001.

Gabriela Tully, et. al. "Integrated Decision Points for Interactive Movies." TIDSE 2004, LNCS 3105, pp. 61-67, Springer-Verlag Berolin Heidelberg.

R. Michael Young, et. al. "An Architecture for Integrating Plan-Based Behaviour Generation with Interactive Game Environments." Journal of Game Development, pp. 1-29, 2004.

Wook-Hee Min, et. al. "Planning-Integrated Story Graph for Interactive Narratives." ACM Multimeida '08. Oct. 31, 2008. pp. 1-6, Vancouver, BC, Canada.

Yun-Gyung Cheong, et. al. "PRISM: A Framework for Authoring Interactive Narratives." ICIDS 2008, LNCS 5334, 2008, pp. 297-308, Springer Verlag Berlin Heidelberg.

Korean Office Action issued Dec. 30, 2014 in counterpart Application No. KR 10-2008-012344 (10 pages, in Korean, with English translation).

\* cited by examiner

STORAGE MEDIUM, APPARATUS, AND METHOD TO AUTHOR AND PLAY INTERACTIVE CONTENT

CROSS-REFERENCE TO RELATED APPLICATIONS

This application claims the benefit under 35 U.S.C. §119 (a) of Korean Patent Applications No. 10-2008-0061971, filed Jun. 27, 2008, and No. 10-2008-0129344, filed Dec. 18, 2008, the disclosures of both of which are each incorporated herein in their entirety by reference.

BACKGROUND

1. Field

The following description relates to interactive content, and more particularly, to a storage medium including stored interactive content and apparatuses and methods to author and play the interactive content.

2. Description of the Related Art

Remarkable developments in computing technology now enable users to create content by themselves and share the created content with a community over the Internet. The users may create animation movies using a flash-based authoring tool or author user created content (UCC) on the Internet.

There is an increasing need for non-linear content, that is, interactive content to enable interaction between a user and the content and to contain a variety of scenarios that may be played according to the user's input instead of linear content containing one scenario and enabling no interaction between a user and the content.

SUMMARY

In one general aspect, a storage medium to store interactive content includes at least one content unit and interactive content including story map information, the story map information selectively connecting the at least one content unit according to conditions to form a story.

The story map information may include first connection information configured to define conditional branches among content units and second connection information configured to define pre-conditions and post-conditions of content units.

The story map information may include first connection information configured to form an explicit story plot for the at least one content unit and second connection information configured to reflect interaction with a user not described in the explicit story plot.

The second connection information may include pre-conditions and post-conditions configured to connect respective content units automatically according to the interaction with the user.

The story map information may include information configured to combine a branching graph scheme and a planning scheme.

In another general aspect, an interactive content authoring apparatus includes a story-map creator configured to create story map information that selectively connects at least one content unit according to conditions to form a story and an encoder to combine the created story map information with the at least one content unit to create interactive content.

The story-map creator is configured to create story map information may include first connection information to define conditional branches among content units and second connection information to define pre-conditions and post-conditions of content units.

The story-map creator may be configured to create story map information that may include first connection information to form an explicit story plot for the at least one content unit and second connection information to reflect interaction with a user not described in the explicit story plot.

The second connection information may include pre-conditions and post-conditions configured to automatically connect content units according to the interaction with a user.

The story-map creator may be configured to create story map information to apply a combination of a branching graph scheme and a planning scheme.

The storage medium to store interactive content may further include an interface to receive a user input, an interpreter to interpret the user input, and a decoder to parse a content file required for authoring, where the story-map creator may be configured to create the story map information to include first connection information or second connection information for the parsed content file according to the interpreted user input.

In yet another general aspect, an interactive content playing apparatus includes a decoder to parse interactive content to be played and a story map manager to interpret story map information selectively connecting at least one content unit of the parsed interactive content according to conditions to form a story, and to tell the story based on the interpreted story map information according to a user input.

The story map manager may be configured to interpret story map information including first connection information to define conditional branches among content units and second connection information to define pre-conditions and post-conditions of content units and the story map manager tells the story based on the first connection information or the second connection information, according to the user input.

The story map manager may be configured to interpret story map information including first connection information to form an explicit story plot for at least one content unit and second connection information to reflect interaction with the user not described in the explicit story plot and the story map manager is configured to tell the story based on the first connection information or the second connection information, according to the user input.

The second connection information may include pre-conditions and post-conditions to connect respective content units automatically according to the interaction with the user.

The story map manager may be configured to interpret story map information to apply a combination of a branching graph scheme and a planning scheme.

In another aspect, a method of authoring interactive content using an interactive content authoring apparatus includes creating by a story-map creator first connection information to form an explicit story plot for at least one content unit and creating by the story-map creator second connection information to reflect interaction with a user not described in the explicit story plot.

In yet another general aspect, a method of playing interactive content by an interactive content playing apparatus includes receiving a user input, parsing, by a decoder, interactive content to be played, and interpreting, by a story map manager, story map information including first connection information to form an explicit story plot for at least one content unit and second connection information to reflect interaction with a user not described in the explicit story plot, and telling, by the story map manager, a story based on the first connection information or the second connection information according to the user input.

Other features and aspects will be apparent from the following description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly various changes, modifications, and equivalents of the media, methods, apparatuses, and systems described herein will be suggested to those of ordinary skill in the art. Also, descriptions of well-known functions and structures may be omitted for increased clarity and conciseness.

For the convenience of the reader, a list of terms used throughout the specification generally provided as follows.

The term "story" includes a series of events.

The term "plot" includes a sequence of events created for artistic or emotional effect. Dramatic effects of telling the same story may depend on the structure of the plot. That is, there may be several storylines for one story.

The term "interactive content" includes content whose scenario may change or a variety of events that may occur according to user input. The interactive content may also be called an interactive story, in which the story may be adaptively changed by interaction between a user and a system.

As stories are told by computer narrators in place of human narrators, related technology has developed. A data structure representing the interactive story may be formed by a branching graph scheme and a planning scheme. The two schemes are described below.

The term "linear content" includes one scenario without interaction between a user and the content.

The term "non-linear content" includes interaction between a user and the content, in which various scenarios may be played according to a user input. Interactive content are a type of non-linear content.

The term "story map" includes a story schema which may be efficiently formed using a combination of the branching graph scheme and the planning scheme, described below, to form interactive content.

Content unit nodes may have pre-conditions and post-conditions. The respective content unit nodes may be connected by branches to form one graph.

The story map includes of one or more graphs.

The term "content unit" includes a unit of content constituting an interactive content, and may selectively have conditional branches, pre-conditions and post-conditions, unlike conventional nodes.

A Branching Graph Scheme to Form Interactive Content

A branching graph scheme may include technology to represent an interactive story by means of a kind of graph by connecting relationships among nodes using links. That is, an author may form several scenarios that can be branched using nodes and branches.

The branching graph includes nodes and branches as primary components. The nodes represent situations or states of a story, and the branches, as a kind of connection lines are defined to connect nodes to one another. In other words, the nodes may represent scripted scenes or stages, and the branches may represent branch conditions for scene transition. One or more branches may be set up in one node and a branch satisfying conditions may determine a next node.

A product authored by the branching graph scheme has a graph structure including nodes and branches. Different scenarios may be told according to a user input.

Figure 1:
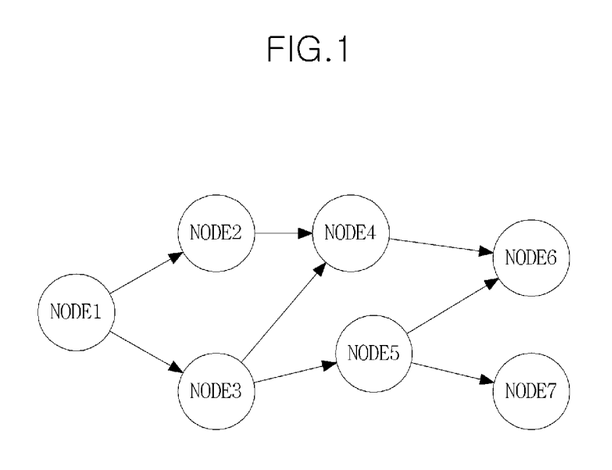
FIG. 1 is a diagram illustrating an exemplary branching graph scheme.

FIG. 1 is a diagram illustrating an exemplary branching graph scheme. Referring to FIG. 1, a scene may be set as a node. When an input satisfying conditions in each event is provided by a user, a branch may be established for movement to other nodes.

The branching graph scheme may specify a plot of an interactive story, and may maintain suspense of the story by emphasizing an authoring intention. On the other hand, since the plot is fixed in an authoring step, a storyline deviating from the plot designated by the author is unable to be told. Accordingly, user interaction is limited and the author may be required to designate links for all cases.

A Planning Scheme for Forming Interactive Content

A planning scheme is a scheme to, given a current state and a goal state, plan a process to reach the goal state from the current state to automatically connect a series of content. Primary planning elements may include nodes, pre-conditions, post-conditions, and a planning algorithm. The nodes represent situations or states of a story, and the pre-conditions of each node are conditions satisfied prior to the node being performed. The post-conditions are conditions to be satisfied after the node is performed and also may be called effects of an action to update the current state. The planning algorithm is used to establish a plan to reach the goal state from the current state. A variety of planning algorithms may be used according to purpose. An author may set pre-conditions and post-conditions in each node, such that the story is told from a current state to a node satisfying the conditions.

Figure 2:
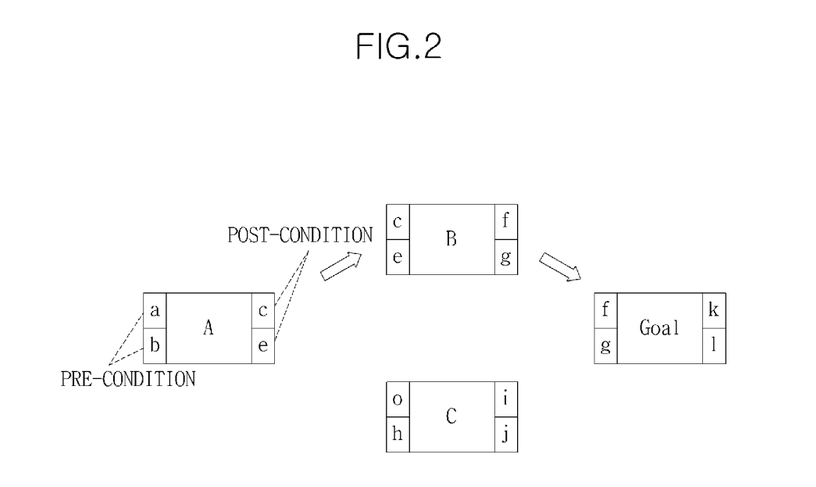
FIG. 2 is a diagram illustrating an exemplary planning scheme.

FIG. 2 is a diagram illustrating an exemplary planning scheme. Referring to FIG. 2, a structure of a planning scheme to move from node A as a current state to a desired node as a state that has accomplished a specific purpose is shown. For a unit story of node A to be told, pre-conditions a and b should be satisfied. When the story telling node A is completed, post-conditions c and e may be satisfied. Accordingly, the story telling is connected to node B satisfying pre-conditions c and e. When the story telling node B is completed, post-conditions f and g are satisfied and a desired node having the post-conditions f and g as pre-conditions may be reached.

In the planning scheme, the connections among the nodes are not limited to the links and a desired node may be determined according to the conditions, which widens a user interactive range and enables a storyline not expected by an author to be told. However, since a plot may be created in response to a user input, the story may be difficult to tell dramatically and logical connections among nodes should be calculated to establish the pre-conditions and the post-conditions, which may degrade productivity and may likely cause an error. In fact, the planning scheme typically works only for a story having events listed without emotional changes or a story considering a goal rather than a course to reach the goal.

In summary, there is a tradeoff between the quality of a scenario including dramatic suspense of a story and freedom of interaction with a user. That is, the branching graph scheme may guarantee higher quality of the scenario, but may provide a lower freedom of interaction, while the planning scheme may provide a greater freedom of interaction, but may not guarantee a high quality of scenario.

In other words, the branching graph scheme can explicitly form an interactive content story but is unable to tell the story when there are no branches among nodes and provides limited interaction with the user. The planning scheme may provide a greater freedom of interaction with the user but may have difficulty with regard to story formation and dramatic story telling.

In addition, the branching graph scheme and the planning scheme each have a limited process of authoring interactive content.

In the branching graph scheme, an author should designate connections among content units for all cases, and the story may not be told along paths previously designated by the author, resulting in limited interaction with the user. When a user requests other matters not included in the content, other content is unable to be referenced and provided due to the absence of branches.

The planning scheme may not guarantee the quality of a story that is automatically formed through planning. That is, since the planning scheme is unable to emphasize a specific storyline to increase the suspense of a scenario, it may be ineffective at automatically forming a story having dramatic elements using the planning algorithm. In fact, the planning scheme may work only for a story having a listed telling or a planar story schema. In addition, it may be very difficult for the author to calculate all logical connections among content and establish the pre-conditions and the post-conditions. A system may not automatically resolve erroneous logical connections, which may be caused due to an author's mistake.

Accordingly, to provide a definite storyline, it may be explicit and effective to use the branching graph scheme. On the other hand, for free interaction, it may be convenient and efficient to use the planning scheme.

The following description proposes an exemplary schema of interactive content to which both the branching graph and the planning may be applied, an exemplary apparatus to author the interactive content, and an apparatus to play or present the interactive content. In particular, a story map structure using a combination of the branching graph scheme and the planning scheme in order to improve scenario quality of the interactive content and increase freedom of interaction is described.

The following description also describes interactive content that may use a story map structure capable of explicitly leading dramatic flow of the story according to an author's intentions and may enable support of flow according to various states and requests of a user, using an exemplary combination of the branching graph scheme and the planning scheme, and exemplary apparatuses and methods of authoring and playing the interactive content by use of the story map structure.

The branching graph structure may be used for a main plot leading dramatic flow of a story, and the planning structure may be used for flow based on various requests or states of the user. That is, a story map structure may take advantage of the branching graph structure and the planning structure in which both branching and planning may overcome limitations. A schema of interactive content to implement the story map, and the architecture of the authoring apparatus and the playing apparatus, are described in greater detail below.

Figure 3:
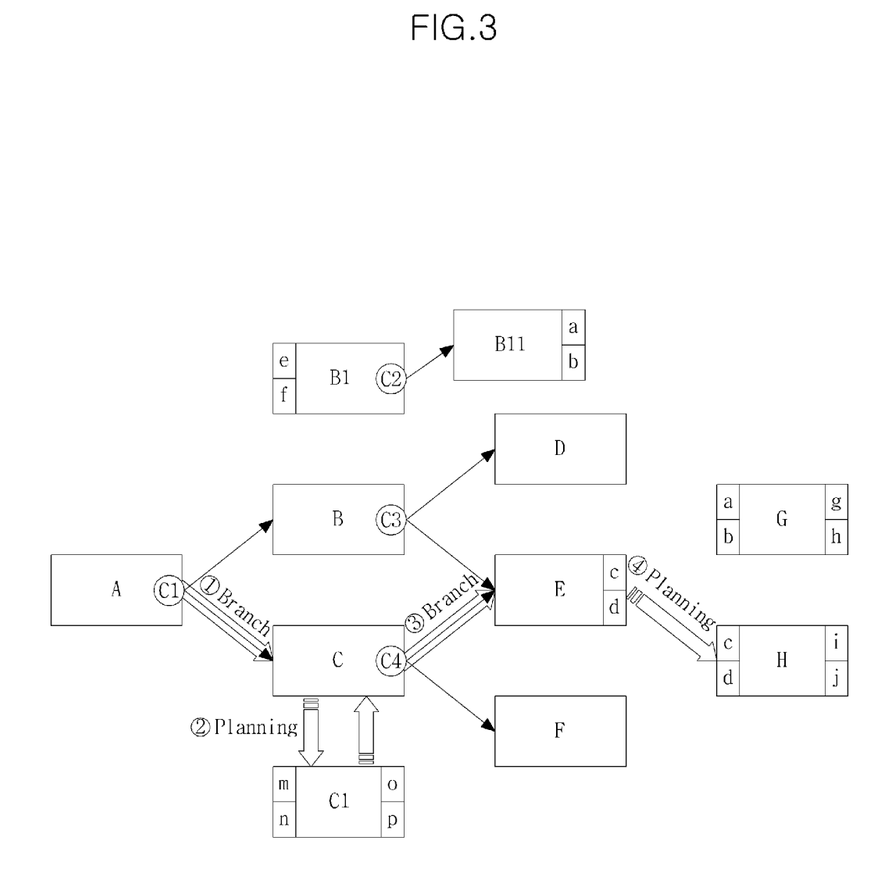
FIG. 3 is a diagram illustrating an exemplary story map.

FIG. 3 is a diagram illustrating an exemplary story map. Here, an example of interactive content using a story map structure is shown in which the branching graph scheme and the planning scheme to guarantee quality of scenario and to increase freedom of interaction.

First a user provides an input at a branch point of content unit A and the content flow moves to content unit C via a conditional branch according to the result of matching the current states and the branch condition C1.

Second, the user requests any content unit with a satisfied pre-condition "m." In this case, when the states of the user or the story satisfy a pre-condition "n," the content flow moves to content unit C1. When content unit C1 ends, the flow returns to the break point of content unit C where an interrupt is generated to play remaining content.

Third, the user played content unit E along the comparison result of a branching condition C4 and the current states at the branch point of content unit C, a post-condition "c" and a post-condition "d" of content unit E are satisfied. When the content unit E ends, the flow moves to the content unit H having pre-conditions "c" and "d" using planning technique because of no explicit branch exists.

According to the story map structure, the story may be told with respect to the content units connected along the branches using the branching graph scheme and may thereby increase likeliness and suspense of the story and improve scenario quality. In addition, a range of user interaction may extend using the planning scheme, resulting in high sensitivity to user needs. Furthermore, when there is no dependence on branches of a specific node, access may be enabled from any position on the story, and may thereby provide a variety of experiences to the user in playing the interactive content.

The interactive content may include at least one content unit and story map information to connect the at least one content unit selectively according to conditions to form a story. In this case, the story map information may include first connection information (i.e., branch connection information) to define conditional branches among content units and second connection information (i.e., planning connection information) to define pre-conditions and post-conditions of the content units.

The story map information may include first connection information (i.e., branch connection information) to form an explicit story plot for at least one content unit, and second connection information (i.e., planning connection information) to reflect interaction with a user. In this case, the second connection information may include pre-conditions and post-conditions to connect respective content units automatically according to interaction with the user that may not be described in the explicit story plot. That is, the story map information may include connection information to apply a combination of the branching graph scheme and the planning scheme.

Figure 4:
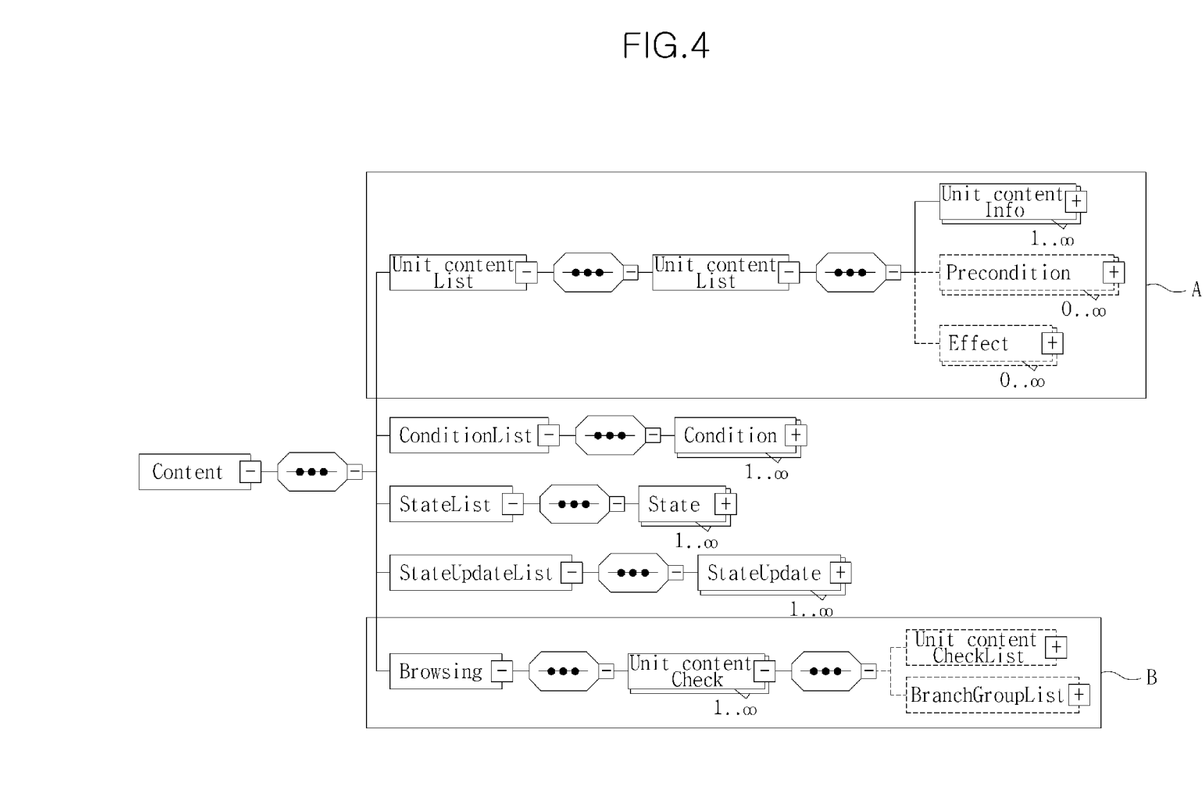
FIG. 4 is a diagram illustrating an exemplary data structure of an interactive content using a story map.

FIG. 4 is a diagram illustrating an exemplary data structure of interactive content using a story map. Primary elements that may be included in the data structure are as follows:

(1) Browsing (i.e., The First Connection Information): Content units may be connected by branches through a BranchGroupList to form a core plot of a story.

(2) ContentUnitList (i.e., The Second Connection Information): A planning scheme may be applied to individual content units because the content units have pre-conditions and post-conditions (effects).

(3) Conditions: Conditions may be used to determine branches and planning and may be referenced by the ContentUnitList and the Browsing.

(4) State: State information may include information about a user, storytelling, and the like, and may be determined by the Conditions and may be updated by StateUpdate and Effect.

(5) StateUpdateList: A StateUpdateList may represent a rule to update the state. For example, this rule may be applied as, "When condition "A" is satisfied, state "A" increments by 1."

The apparatus to author interactive content and the apparatus to play the interactive content may be based on the data schema of the interactive content and are described below.

Figure 5:
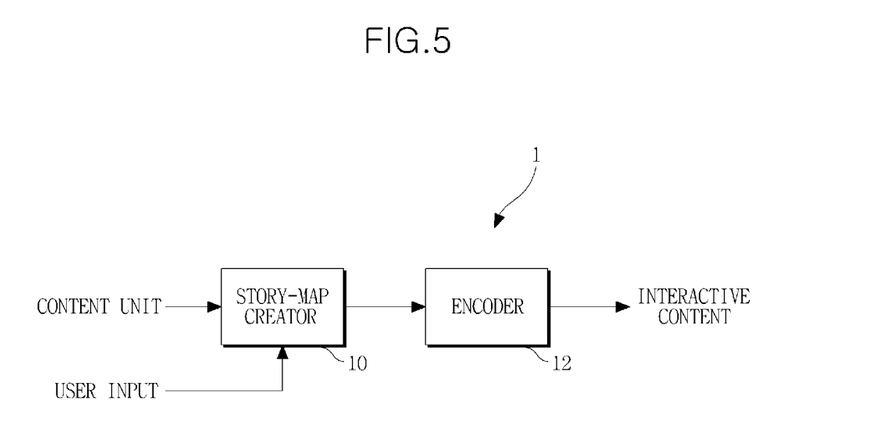
FIG. 5 is a block diagram illustrating an exemplary apparatus to author interactive content.

FIG. 5 illustrates an exemplary apparatus to author interactive content. An exemplary apparatus 1 to author interactive content includes a story-map creator 10 to create story map information to connect at least one content unit selectively according to conditions to form a story and an encoder 12 to combine the created story map information with at least one content unit to create the interactive content.

The story-map creator 10 may receive content unit data and a user input to create story map information that includes first connection information for defining conditional branches among content units and second connection information for defining pre-conditions and post-conditions for the content units. Here, the first connection information may be used to form an explicit story plot for at least one content unit and the second connection information may be used to reflect interaction with a user not described in the story plot. For example, the second connection information may include pre-conditions and post-conditions to connect respective content units automatically according to the interaction with the user. The story-map creator 10 may create story map information to apply a combination of a branching graph scheme and a planning scheme.

Figure 6:
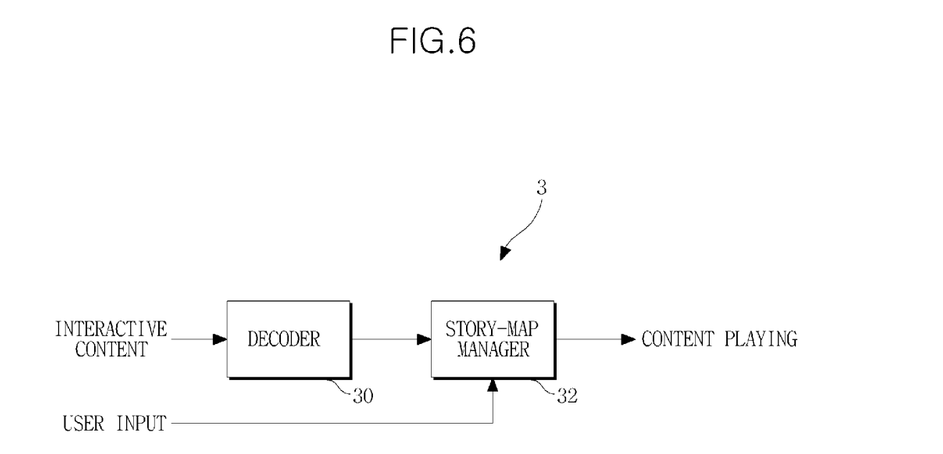
FIG. 6 is a block diagram illustrating an exemplary apparatus to play interactive content.

FIG. 6 illustrates an exemplary apparatus to play interactive content. Referring to FIG. 6, an exemplary apparatus 3 to play interactive content includes a decoder 30 to parse interactive content to be played, and a story map manager 32 to interpret story map information selectively connecting at least one content unit of the parsed interactive content according to conditions to form a story and to tell the story based on the interpreted story map information according to a user input.

The story map manager 32 interprets story map information including first connection information to define conditional branches among the content units and second connection information to define pre-conditions and post-conditions for the content units, and tells the story based on the first connection information or the second connection information according to the user input or the current states.

Here, the first connection information may be used to form a primary story plot for at least one content unit and the second connection information may be used to reflect instant temporary interactions such as several user requests or events. For example, the second connection information may include pre-conditions and post-conditions to connect respective content units automatically according to the interaction with the user. The story map manager 32 may parse story map information to apply a combination of the branching graph scheme and the planning scheme and may control playing of the content unit.

Figure 7:
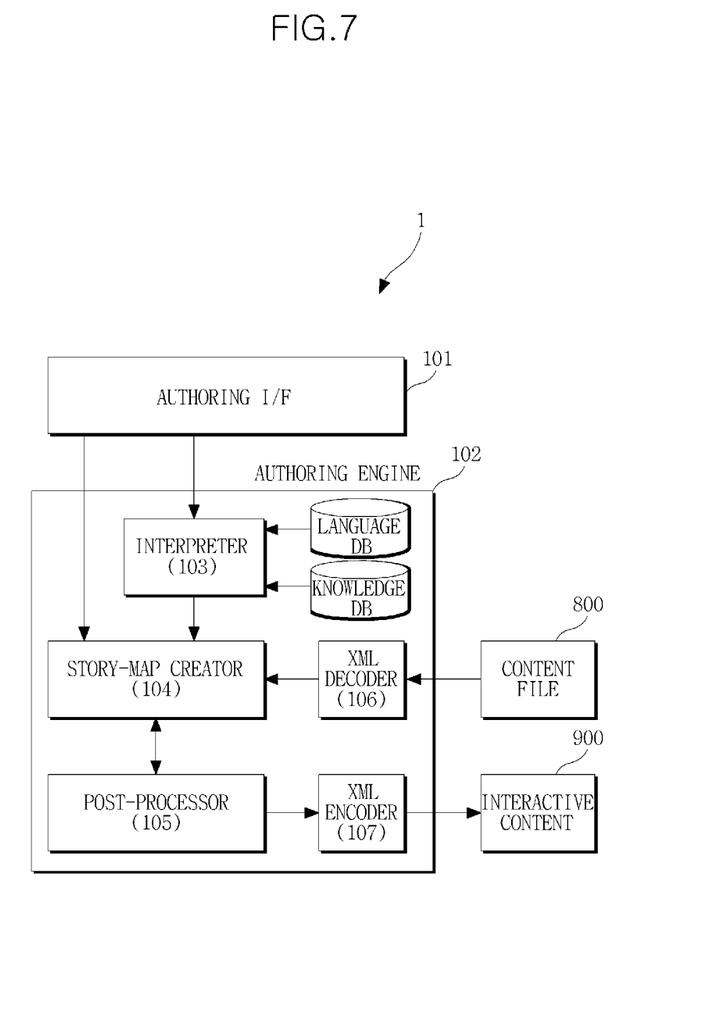
FIG. 7 is a block diagram illustrating an exemplary apparatus to author interactive content.

FIG. 7 illustrates an exemplary apparatus to author interactive content. Referring to FIG. 7, an exemplary apparatus 1 to author interactive content includes an interface 101 to author interactive content including story map information and an authoring engine 102 to process an input received via the interface to create the story map information.

The authoring engine 102 may include an interpreter 103 to interpret a user input and to deliver the resultant user input to the story-map creator 104 and may process a natural language using a language database or perform semantic processing using a knowledge database.

The authoring engine 102 may further include an XML decoder 106 to parse a content file 800 containing a script and to extract a content unit that is a constituent unit of the story map and a story-map creator 104 to create story map information including first connection information and second connection information of each content unit using the interpreted input and the extracted content unit. A determination may be made as to whether the branching graph scheme or the planning scheme may be applied to each content unit based on the interpreted user input.

The authoring engine 102 may include a post-processor 105 to combine the created story map information with any other information and an XML encoder 107 to create an interactive content 900 based on the created story map information. The created interactive content may be implemented using a markup language, such as XML. Here, XML is only one example and other languages may be used.

Figure 8:
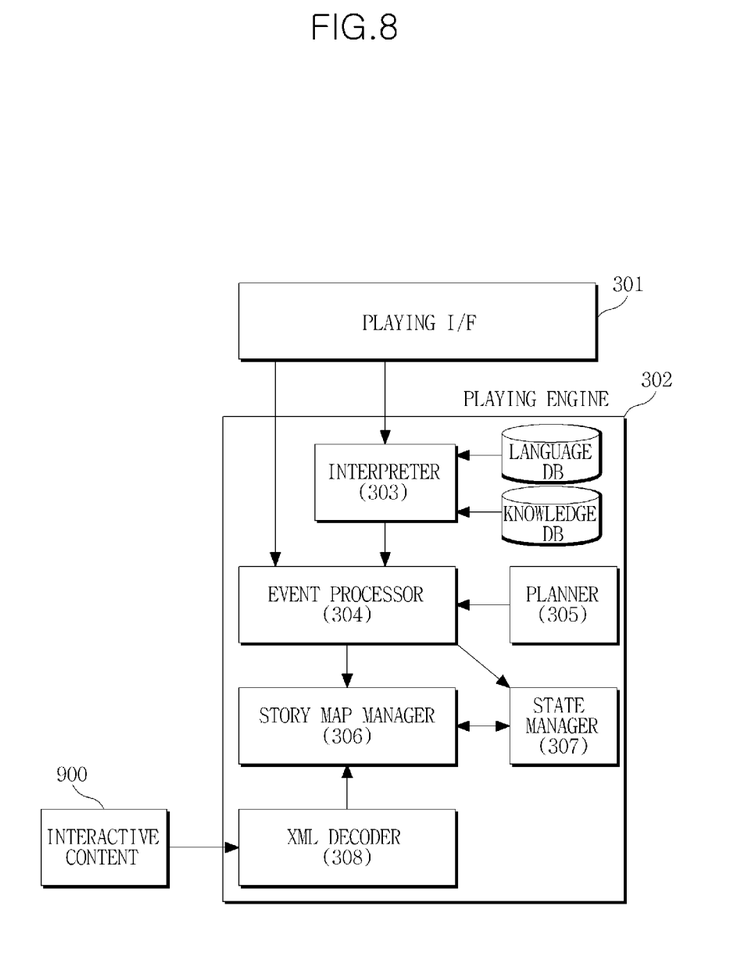
FIG. 8 is a block diagram illustrating an exemplary apparatus to play interactive content.

FIG. 8 illustrates an exemplary apparatus to play interactive content. Referring to FIG. 8, an exemplary apparatus 3 to play interactive content interprets story map information contained in an interactive content and controls content playing so that a user may experience the interactive content in several ways depending on the interpreted information. The apparatus 3 to play interactive content includes a playing interface 301 and a playing engine 302 to interpret story map information contained in the interactive content, to process user interactions received via the interface 301, and to reflect the user interactions in story telling at the time of playing.

The interface 301 may provide a screen area configured to play the interactive content, a control area configured to perform control, a text area configured to input text, and a variety of input area including speech, sound, vision and touch. In the screen area, an event such as mouse click may be possible.

The playing engine 302 may include an interpreter 303 to interpret an input received via the interface 301 and to deliver the input to an event processor 304, the event processor 304 to process an occurring event and to deliver necessary information to a story map manager 306 or a state manager 307, a planner 305 to plan a process to reach a goal state using a planning scheme, and the story map manager 306 to manage story telling using a branching graph scheme and the planning scheme. The planner 305 may be invoked for a task in order to use the planning scheme. The playing engine 302 may further include the state manager 307 to record and manage states indicating storytelling and event occurrence and an XML decoder 308 to parse interactive content to be played and to deliver the content to the story map manager 306.

The above components of the authoring apparatus 1 and the playing apparatus 3 are only illustrative and the apparatuses may be changed so that one component performs several functions or several components perform their functions.

Meanwhile, variations may be made to the authoring apparatus and the playing apparatus. For example, when one content unit is shared between the branch and planning schemes (e.g., when the content unit connected by branches has pre-conditions) a next content unit may be played only when either the branches or the pre-conditions are satisfied. In addition, when one content unit is shared between the branch and planning schemes (e.g., when there are two or more next content units satisfied by the branch and planning schemes) priority may be given to the branch and planning schemes and a next content unit may be determined by a high-priority algorithm. This example is only illustrative and a variety of applications may be performed without departing from the embodiments described herein.

An exemplary method of authoring interactive content in the authoring apparatus and an exemplary method of playing the interactive content in the playing apparatus are briefly described below.

The exemplary method of authoring interactive content may include creating first connection information to form an explicit story plot for at least one content unit and second connection information to reflect interaction with a user not described in the story plot.

The exemplary method of playing interactive content may include receiving a user input, parsing interactive content to be played, and interpreting story map information including first connection information to form an explicit story plot for at least one content unit and second connection information to reflect interaction with a user not described in the story plot. The story may be told based on the first connection information or the second connection information according to the user input.

The exemplary efficient schema of interactive content capable of improving both clarity of the interactive story schema and freedom of interaction, the exemplary apparatus to author the interactive content, and the exemplary apparatus to play the interactive content are described above. In particular, the exemplary story map scheme may use the branching graph scheme and the planning scheme among interactive story representing schemes.

Accordingly, story quality may be guaranteed and freedom of interaction may be increased by forming story map information using a combination of the branch and planning schemes.

Only the primary plot of the story may be connected using the branching graph scheme and the planning scheme may be applied to a variety of other interactions so that content units may be automatically connected. Thus, time and effort required to author the interactive content may be reduced.

Moreover, a primary content representing scheme in interactive content (storytelling) technology may be provided by using a new type of interactive content schema having a combination of several core plots and a variety of user interactions.

Meanwhile, the embodiments described above may be applied to various fields. An exemplary apparatus to effectively author interactive content is described above. Content authoring cost and effort may be reduced by using the exemplary authoring apparatus described above instead of using a conventional authoring tool that applies either a branching technique or a planning technique to provide interactive content. Non-experts may easily author interactive content having interactions with a high degree of freedom while clearly expressing the story, by learning simple usage of the tool. Since a layman as well as an expert may easily create interactive content, creation of bidirectional interactive UCCs may be activated.

A new exemplary apparatus to play interactive content is described. A user may experience suspenseful story telling by correctly utilizing an author's intentions. New content that may enable the user to communicate with the story through real-time questions, answers, and various events, are provided by viewing the interactive content authored by the exemplary apparatus.

Furthermore, a cost for authoring interactive content may be reduced and, as the number of authors increases, an interactive content pool may expand and high-speed updates may be possible. Accordingly, the above-described apparatuses and methods may contribute to activation of an "edutainment" market that is utilizing more interactive content.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interactive content authoring apparatus comprising:
    an extensible markup language (XML) decoder configured to decode, at the decoder, a content file so as to extract content units;
    a story-map creator configured to create story map information, at the creator, using the extracted content units;
    a processor configured to selectively connect the content units according to the story map information and XML encode the connected content units, at the processor, to generate interactive content defining a story; and
    a display for displaying the generated interactive content to an audience, wherein:
    the story map information comprises:
        first connection information defining conditional branches among pairs of the content units for selectively connecting the pairs of content units, and
        second connection information defining pre-conditions and post-conditions corresponding to each of the content units for selectively connecting the pairs of content units, free from dependence on the conditional branches,
    the pre-conditions define conditions, for each of the content units, that must be satisfied before the content unit may be selected according to the second connection information, and
    the post-conditions define conditions, for each of the content units, that are satisfied by the content unit, and
    each pair of the content units is selectively connected according to the second connection information only when the post-conditions of a first content unit of the pair are identical to the pre-conditions of a second content unit of the pair,
    wherein at least one of conditional branch and pre-conditions and post-conditions comprise conditions related to a state information about a user, and
    wherein the interactive content includes a data structure that comprises the state information about the user and a state update list which represents a rule to update the state information when conditions related to the state information about the user are satisfied.

2. The apparatus of claim 1, wherein
    the first connection information forms an explicit story plot for the content units; and
    the second connection information reflects interaction with a user not described in the explicit story plot.

3. The apparatus of claim 1, wherein the story-map creator is configured to create the story map information to apply a combination of a branching graph scheme and a planning scheme.

4. The apparatus of claim 1, further comprising:
an interface to receive a user input; and
an interpreter to interpret the user input,
wherein the story-map creator is configured to create the story map information to include the first connection information and second connection information for the parsed content file according to the interpreted user input.

5. The apparatus of claim 1, wherein each of the content units is a data structure configured to form a node of a branching graph scheme or a planning scheme.

6. The apparatus of claim 1, wherein the interactive content is configured to be played by a computer narrator.

7. The apparatus of claim 1, wherein the story map information provides a story map structure such that the story is formed by selectively connecting the content units through the branches via a branching graph scheme and by selectively connecting the content units through the pre-conditions and post-conditions of the content units via a planning scheme.

* * * * *